(12) United States Patent
Burchfield

(10) Patent No.: US 10,165,770 B2
(45) Date of Patent: Jan. 1, 2019

(54) ADAPTABLE HUNTING BLIND AND METHOD OF USE

(71) Applicant: Blind Disguise Outdoors, LLC, Brandon, MS (US)

(72) Inventor: Robert Mark Burchfield, Windermere, FL (US)

(73) Assignee: Blind Disguise Outdoors, LLC, Brandon, MS (US)

( * ) Notice: Subject to any disclaimer, the term of this patent is extended or adjusted under 35 U.S.C. 154(b) by 246 days.

(21) Appl. No.: 15/166,928

(22) Filed: May 27, 2016

(65) Prior Publication Data

US 2017/0339941 A1    Nov. 30, 2017

(51) Int. Cl.
*A01M 31/02* (2006.01)
*E04H 15/00* (2006.01)
*F16M 13/02* (2006.01)

(52) U.S. Cl.
CPC ......... *A01M 31/025* (2013.01); *E04H 15/001* (2013.01); *F16M 13/022* (2013.01)

(58) Field of Classification Search
CPC ... E04H 15/001; E04H 15/003; E04H 15/005; E04H 15/02; E04H 15/04; E04H 15/60; A01M 31/02; A01M 31/025
USPC ................... 248/530, 540, 125.8, 157, 219.2
See application file for complete search history.

(56) References Cited

U.S. PATENT DOCUMENTS

| | | | | |
|---|---|---|---|---|
| 804,241 | A * | 11/1905 | Nootbaar | G08B 13/08 116/12 |
| 1,175,352 | A * | 3/1916 | Hand | E04H 12/2215 248/156 |
| 2,594,410 | A * | 4/1952 | Feldpausch | A01M 31/00 135/141 |
| 2,886,047 | A * | 5/1959 | Healy | E04H 15/003 135/139 |

(Continued)

FOREIGN PATENT DOCUMENTS

DE       19829223 A1 *  3/1999  .............  E04H 15/04

*Primary Examiner* — Daniel J Troy
*Assistant Examiner* — Danielle Jackson
(74) *Attorney, Agent, or Firm* — Veritay Group IP; Susan Fentreg

(57) ABSTRACT

This invention relates to an adaptable hunting blind made of an annular ring with a connector, wherein the annular ring has a camouflage portion extending downwardly from the annular ring. The adaptable hunting blind includes a plurality of telescoping tubes each of the telescoping tubes made of a pole assembly having a plurality of connected hollow pole sections. Each of the plurality of connected hollow pole sections is made of a proximal pole section and at least one distal pole section. Each of the plurality of connected hollow pole sections also includes a solid substantially cylindrical section having a proximal end and a distal end. The solid substantially cylindrical section proximal end is fixedly positioned within the pole assembly, while the solid substantially cylindrical section distal end is tapered and is configured to project from the distal end of the pole assembly. The adaptable hunting blind further includes a first (Continued)

securing device positioned substantially perpendicular to the vertical axis of the pole assembly at the proximal pole section; and a second securing device positioned substantially perpendicular to the vertical axis of the pole assembly at the distal pole section.

10 Claims, 10 Drawing Sheets

(56) References Cited

U.S. PATENT DOCUMENTS

| | | | | |
|---|---|---|---|---|
| 3,318,560 | A * | 5/1967 | Garrette, Jr. | E04H 12/182 248/156 |
| 3,858,833 | A * | 1/1975 | Fink | A01K 97/10 248/530 |
| 4,937,965 | A * | 7/1990 | Narvaez | F41A 23/02 42/94 |
| 5,088,514 | A * | 2/1992 | House | E04H 15/58 135/139 |
| 5,301,706 | A * | 4/1994 | Jones | E04H 15/001 135/125 |
| 5,669,403 | A * | 9/1997 | Belcher | A01M 31/025 135/120.4 |
| 5,836,327 | A * | 11/1998 | Davis | A45B 11/00 135/16 |
| 6,431,192 | B2 * | 8/2002 | O'Hare | A01M 31/025 135/125 |
| 7,172,168 | B1 * | 2/2007 | Kallas | E04H 12/2215 135/16 |
| 7,182,091 | B2 * | 2/2007 | Maddox | A01M 31/025 135/90 |
| 7,484,699 | B1 * | 2/2009 | Ziegler | A45F 3/44 248/156 |
| 7,520,485 | B1 * | 4/2009 | Giannetto | A01K 97/10 173/91 |
| 7,556,052 | B2 * | 7/2009 | Wright | A01M 31/025 135/117 |
| 7,568,306 | B1 * | 8/2009 | Rice, Sr. | A01K 97/10 248/530 |
| 7,735,503 | B2 * | 6/2010 | Jenkinson | A01M 31/025 135/135 |
| 8,201,571 | B1 * | 6/2012 | Smith | E04H 15/04 135/117 |
| 8,360,083 | B2 * | 1/2013 | Anders, III | E04H 15/001 135/151 |
| 8,881,753 | B2 * | 11/2014 | Rowley | E04H 15/001 135/144 |
| D784,800 | S * | 4/2017 | Burchfield | D8/396 |
| 9,663,191 | B2 * | 5/2017 | Cromartie | B63B 21/26 |
| 2002/0152665 | A1 * | 10/2002 | Varnado | A01M 31/025 43/1 |
| 2003/0024559 | A1 * | 2/2003 | Fields | A01M 31/025 135/90 |
| 2007/0144569 | A1 * | 6/2007 | Fereghetti | F41H 3/00 135/90 |
| 2007/0144570 | A1 * | 6/2007 | Cooper | A01M 31/025 135/90 |
| 2008/0061195 | A1 * | 3/2008 | Carnevali | F16M 11/14 248/125.8 |
| 2012/0012142 | A1 * | 1/2012 | Frady | E04H 15/001 135/90 |
| 2012/0211043 | A1 * | 8/2012 | Mulligan | E04H 15/001 135/143 |

* cited by examiner

ADAPTABLE HUNTING BLIND AND METHOD OF USE

CROSS-REFERENCE TO RELATED APPLICATIONS

Not applicable.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

This disclosure relates to an adaptable hunting blind that is configured t be used in a tree or on the ground and a method of use.

Description of Related Art Including Information Disclosed Under 37 CFR 1.97 and 1.98.

Tree stands are used by hunters when hunting game, such as deer or elk to on elevated hunting platform. Tree stands are designed to be leaned against and/or anchored relative to the trunk of a tree. A tree stand generally includes a foldable ladder for vertical access and a collapsible seat or platform for obtaining a comfortable and safe position while elevated. Tree stands provide advantages to hunters such as: unobstructed views of an area of the woods and reduced scent since the hunter is elevated above ground level. However, even in a tree stand a hunter can be detected by an animal. Therefore, many hunters camouflage their tree stand. Various tree stand systems are known to hunters involving various attachment mechanisms and camouflage drapes. Other hunters may not use a tree stand, but may still wish to use a blind. Therefore, a need exists in the industry for a device which is adaptable to be attached to any tree stand to provide greater camouflage for the hunters, and also functions as a stand-alone ground blind using the same equipment.

BRIEF SUMMARY OF THE INVENTION

This invention relates to an adaptable hunting blind made of an annular ring formed from a plurality of connected segments; a camouflage portion extending downwardly from the annular ring; a strap of sufficient length to wrap around a tree trunk, wherein the strap is configured to connect to the annular ring; a plurality of telescoping tubes, each made of a plurality of connected hollow pole sections. The hollow pole sections include a proximal pole section and at least one distal pole section, wherein the proximal pole section has a diameter greater than the at least one distal pole section. A solid substantially cylindrical section having a proximal end and a distal end, the solid substantially cylindrical section proximal end is fixedly positioned within the pole assembly. The solid substantially cylindrical section distal end being tapered and configured to project away from the least one distal pole section. A first securing device positioned substantially perpendicular to a vertical axis of the pole assembly. The first securing device being rotatably connected to the proximal pole section. A second securing device positioned substantially perpendicular to the vertical axis of the pole assembly and is connected to at least one distal pole section.

BRIEF DESCRIPTION OF SEVERAL VIEWS OF THE DRAWING(S)

The invention can be best understood by those having ordinary skill in the art by reference to the following detailed description when considered in conjunction with the accompanying drawings in which.

DETAILED DESCRIPTION OF THE INVENTION

Figure 1:
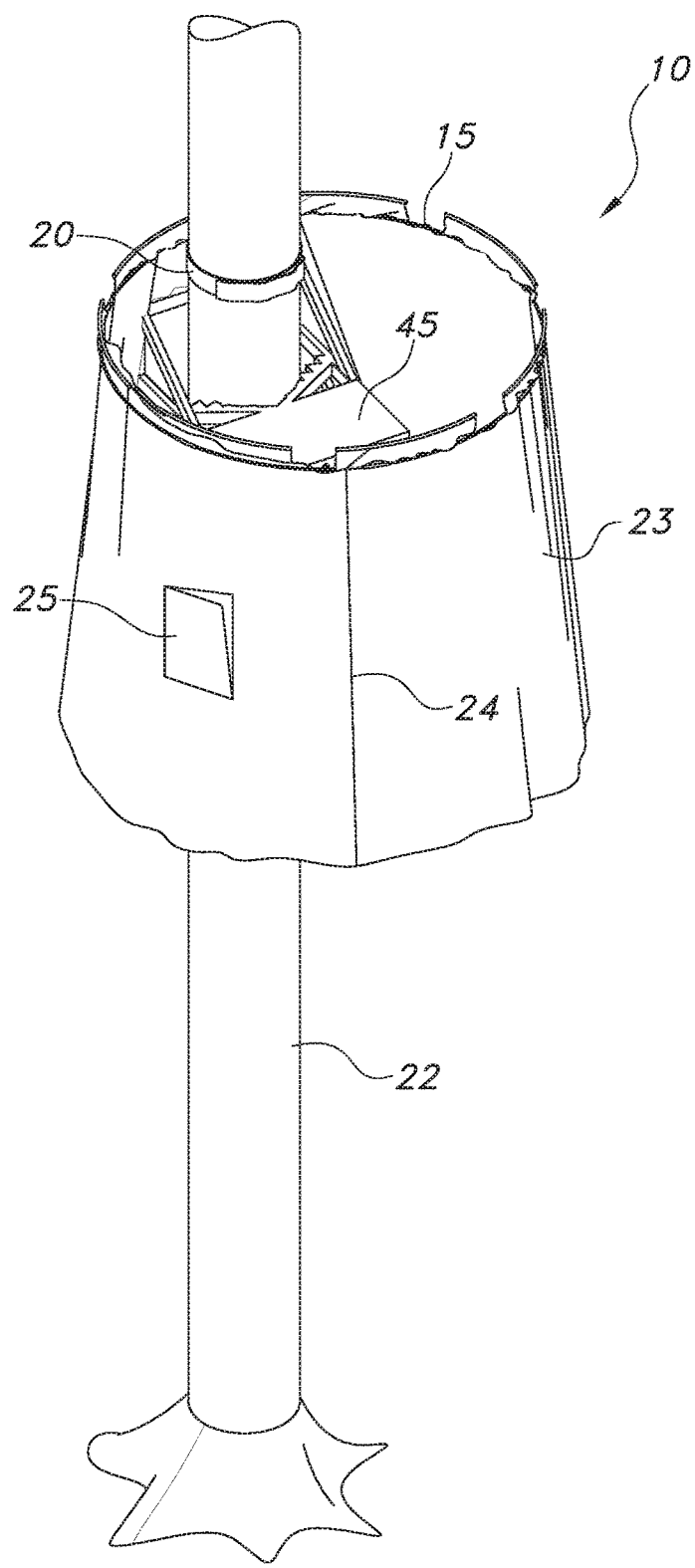
FIG. 1 illustrates an embodiment of the adaptable hunting blind apparatus as configured to attach to a tree stand.

The present invention may be understood more readily by reference to the following detailed description of the invention. It is to be understood that this invention is not limited to the specific devices, methods, conditions or parameters described herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately"

another particular value. When such a range is expressed, another embodiment includes from the one particular value and/or to the other particular value. Similarly, when values are expressed as approximations, by use of the antecedent "about," it will be understood that the particular value forms another embodiment.

These and other aspects, features and advantages of the invention will be understood with reference to the detailed description herein, and will be realized by means of the various elements and combinations particularly pointed out in the appended claims. It is to be understood that both the foregoing general description and the following detailed description of the invention are exemplary and explanatory of preferred embodiments of the inventions, and are not restrictive of the invention as claimed. Unless defined otherwise, all technical and scientific terms used herein have the same meaning as commonly understood by one of ordinary skill in the art to which this invention belongs. Reference will now be made in detail to the presently preferred embodiments of the invention, examples of which are illustrated in the accompanying drawings. Throughout the following detailed description, the same reference numerals refer to the same elements in all figures.

Figure 2A:
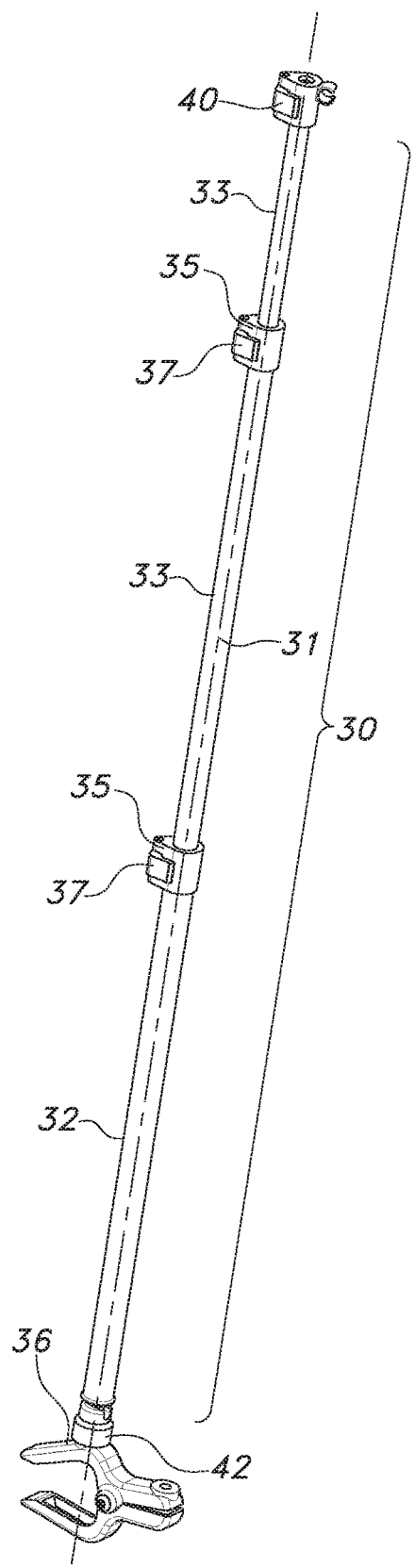
FIG. 2A illustrates an embodiment of a securing device configured to attach to the adaptable hunting blind assembly to a tree stand.
Figure 2B:
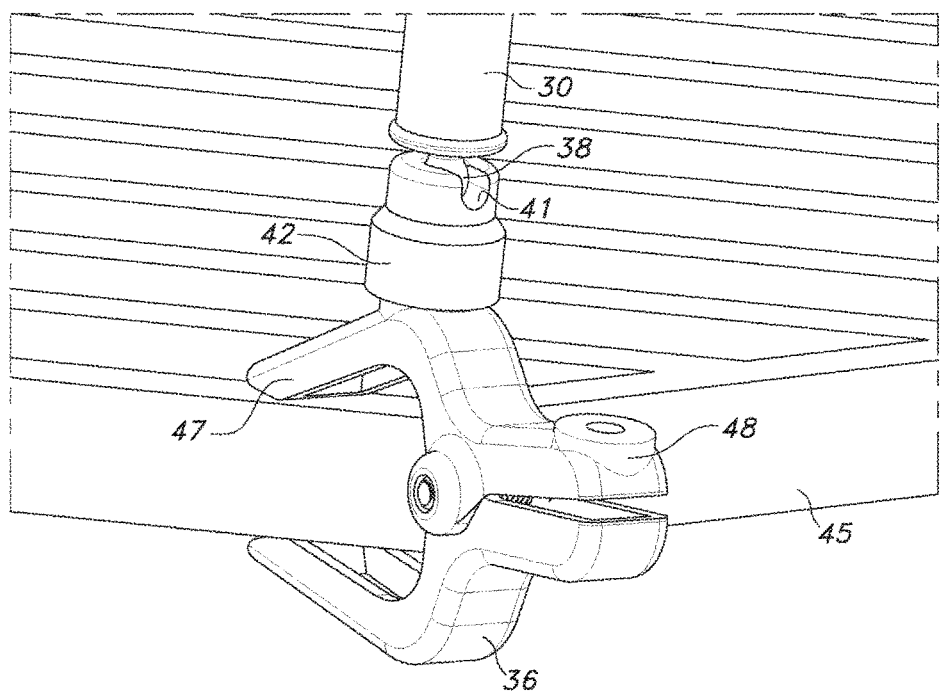
FIG. 2B illustrates an embodiment of a close up view of the securing device configured to attach to the adaptable hunting blind assembly to a tree stand.
Figure 3:
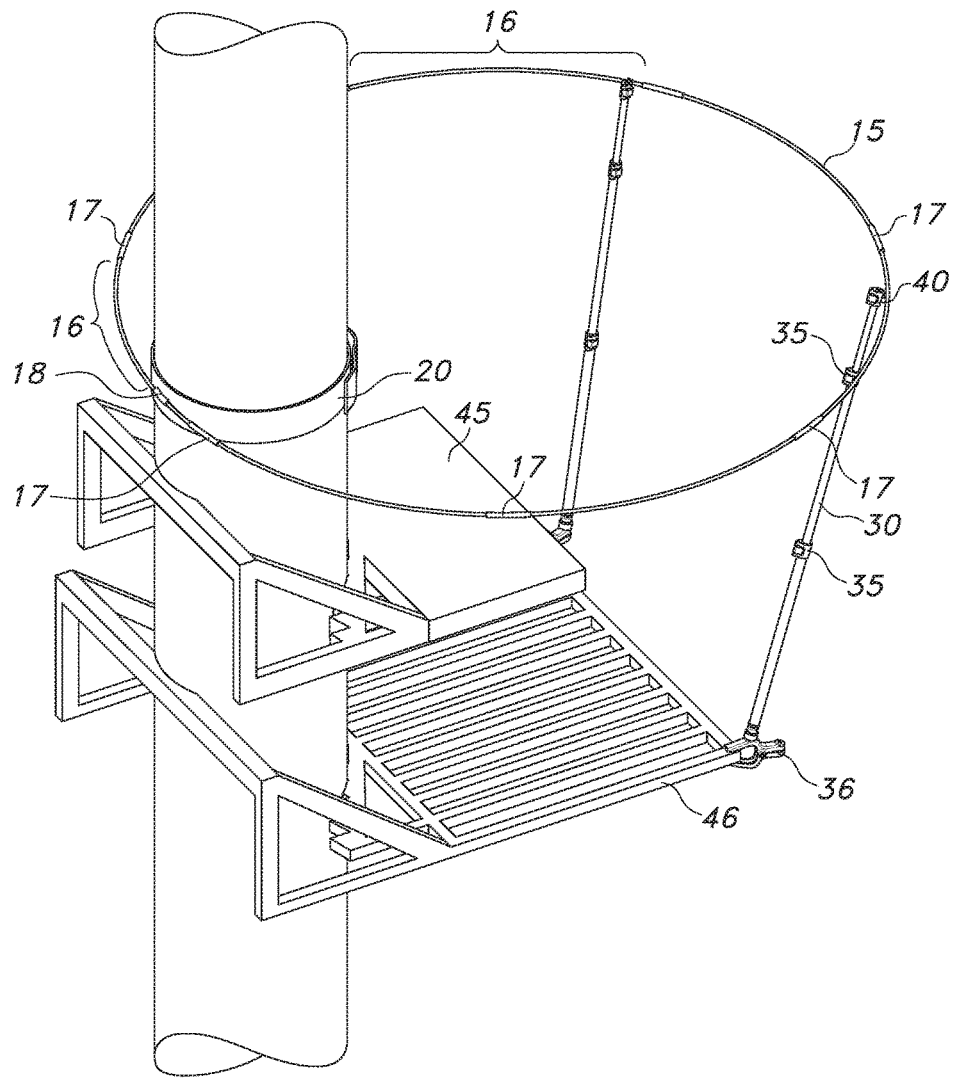
FIG. 3 illustrates an embodiment of the adaptable hunting blind assembly as configured to attach to a tree stand.

Referring to FIGS. 1-3 an illustrative embodiment is provided showing an adaptable hunting blind assembly 10 configured to provide camouflage in an outside setting, such as, surrounding a tree-stand 45. The adaptable hunting blind assembly 10 is made of an annular ring 15 formed from a plurality of segments 16 joined by a connector 17. The annular ring 15 is of sufficient diameter to surround a user such as a hunter or a photographer in a tree stand 45 or a user on the ground. A strap 20 of sufficient length to surround a tree trunk 22 is provided. In one embodiment, the strap 20 includes a tubular opening or sleeve 18 configured to receive the annular ring 15. The annular ring 15 has a camouflage portion 23 extending downwardly from the annular ring 15. The camouflage portion 23 is made of a light fabric or plastic. The camouflage portion 23 is attached to the annular ring 15 by conventional means such as, pockets in the camouflage portion 23 or clips (not shown). The camouflage portion 23 can include a plurality of slits 24 to allow the projection of a gun, arrow or camera. Similarly, a window 25 in the camouflage portion 23 can be provided to the allow projection of a gun, arrow or camera.

Referring to FIG. 2A, an illustrative embodiment is provided showing a pole assembly 30. The pole assembly 30 is made up of a plurality of connected hollow pole sections 32 and 33. The pole assembly 30 is made up of a proximal pole section 32 and at least one distal pole section 33. In one embodiment, each of the pole sections 32 and 33 are connected by a telescoping tube clamp 35 with a clamping lever 37 that allows for quick adjustment of the length of the pole assembly 30. The pole sections 32 and 33 can be made of carbon fiber, stainless steel or any material known to one skilled on the art. In one embodiment, the proximal pole section 32 is the longest and largest diameter pole section of the pole assembly 30 and the at least one distal pole section 33 is configured to telescope within the proximal pole section 32. In one exemplary embodiment, the length of the proximal pole section 32 is four feet, and the proximal pole section 32 makes up at least one-half of the total length of the pole assembly 30. In another embodiment, the pole sections 32 and 33 are of substantially the same length. The at least one distal pole section 33 is sequentially smaller in diameter than the proximal pole section 32. With this configuration, the diameter of the subsequent pole sections 33 fits within the proximal pole section 32 in a telescoping manner. A telescoping tube clamp 35 with a clamping lever 37 is used to lock the pole sections 32 and 33 in place relative to each other.

The proximal pole section 32, of the pole assembly 30 is attached to a first securing device 36, such as a "C" spring clamp. The first securing device 36 is positioned substantially perpendicular to vertical axis 31 of the pole assembly 30. In one embodiment, the first securing device 36 of the proximal pole section 32 of the pole assembly 30 is oriented to connect a tree-stand 45. The at least one distal pole section 33 of the pole assembly 30 has a second securing device 40, such as "C" ring that is positioned substantially perpendicular to the vertical axis 31 of the pole assembly 30. In the embodiment shown, the second securing device 40 of the pole assembly 30 is oriented to connect to the annular ring 15.

Now referring to FIG. 2B, a close up view of a rotatable connection between the pole assembly 30 and the first securing device 36 of the proximal pole section 32 is shown. A ball 38 is attached to the pole assembly 30. The ball 38 is positioned to be retained in socket 41. The socket 41 is positioned in the attachment member 42. The attachment member 42 can be connected on the top arm 47 of the attachment member 42, on the "C" portion of the clamp, to facilitate the clamping of the first securing device 36 to the tree-stand 45. In an alternative embodiment, the attachment member 42 can be connected to the grip section 48 of the attachment member 36, depending on the type of clamp used.

Figure 4:
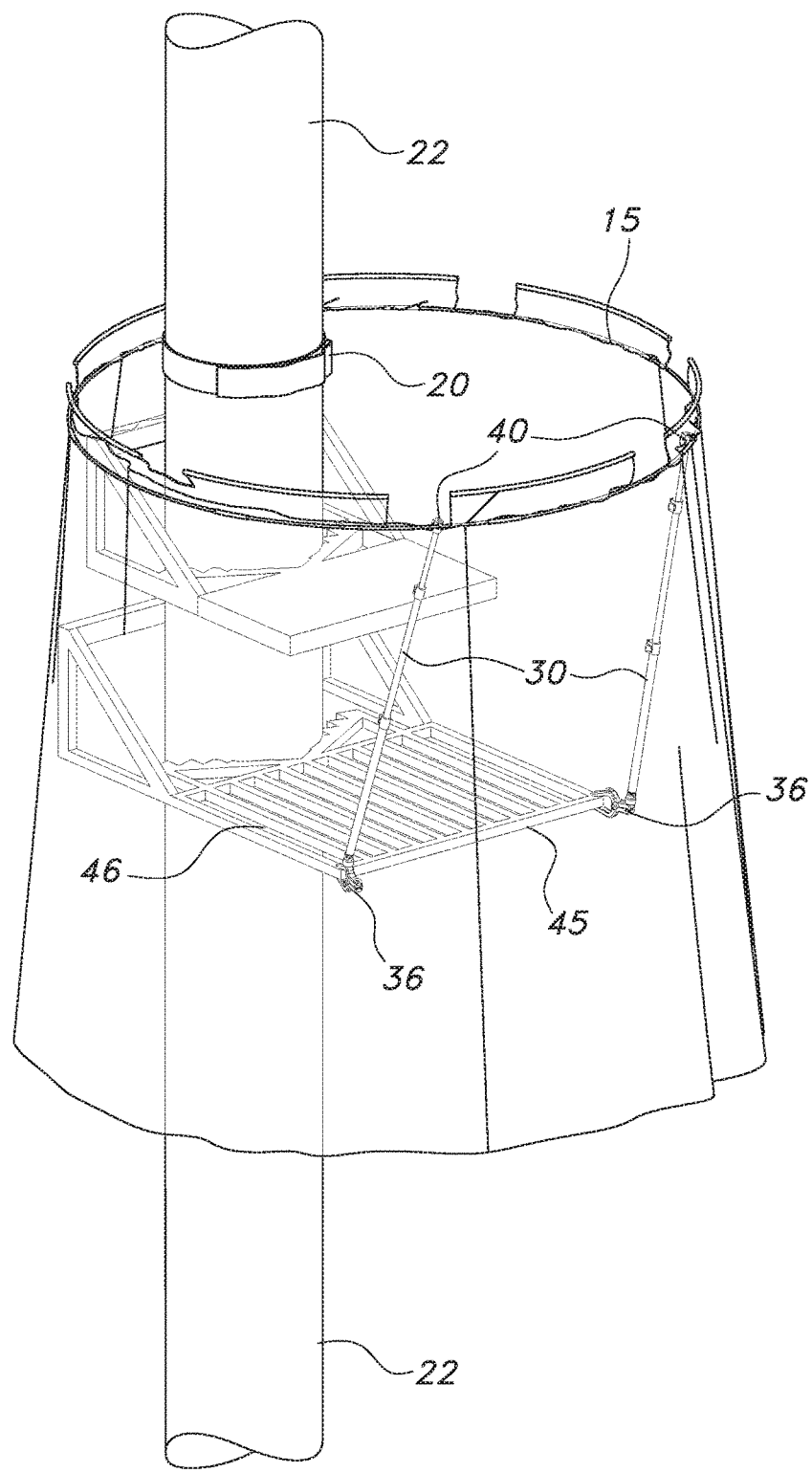
FIG. 4 illustrates an embodiment of the adaptable hunting blind assembly as configured to attach to a tree stand.
Figure 5:
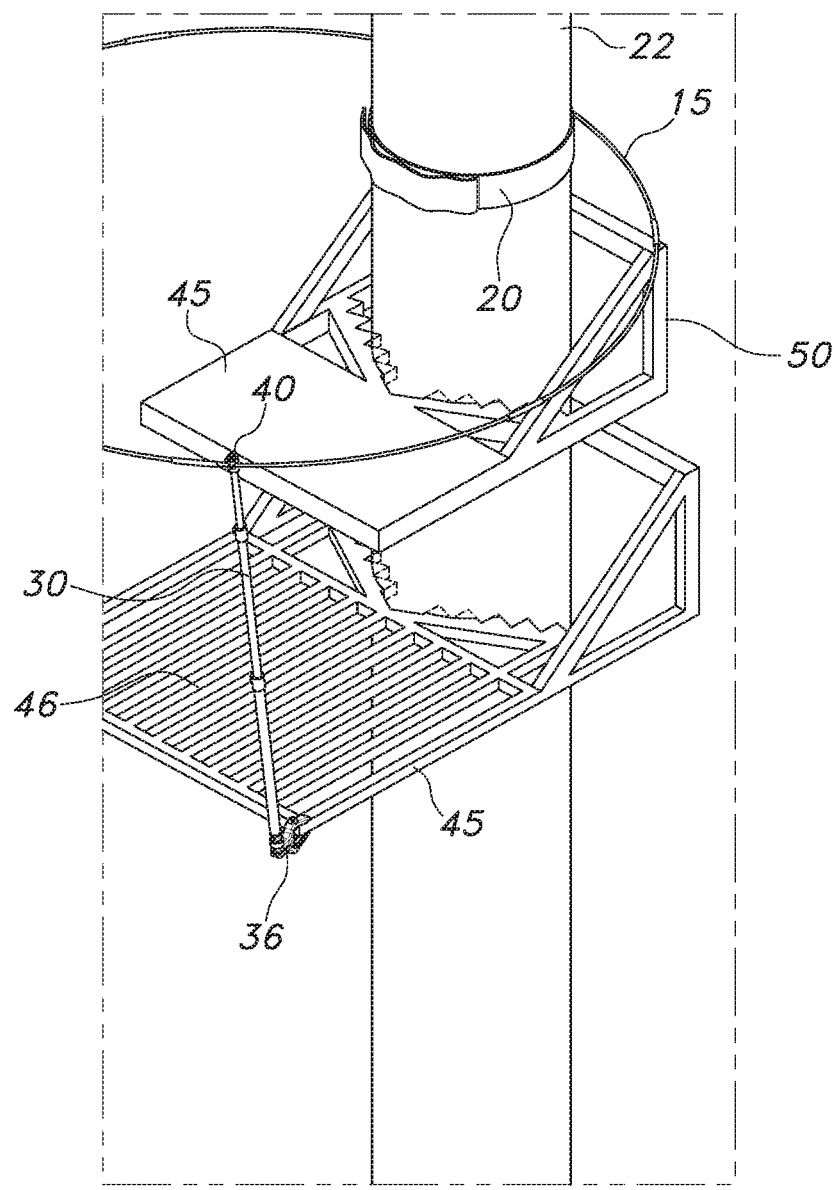
FIG. 5 illustrates an embodiment of a securing device affixed to the adaptable hunting blind apparatus.

Now referring to FIGS. 3-5 a tree-stand 45 is shown connect to tree 22. In this embodiment, the adaptable hunting blind assembly 10 is attached to the tree-stand 45. Each of the first securing devices 36 are connected to the tree-stand 45, preferably to the floor 46 of the tree-stand 45. Each of the second securing devices 40 are, connected to the annular ring 15. The second securing device 40 is sized to retain the annular ring 15. The annular ring 15 is connected to the tree 22. In this configuration, the adaptable hunting blind assembly 10, conceals the hunter or photographer who is in the tree-stand 45.

Referring to FIGS. 6, 7, 8A, 8B and 9, an illustrative configuration is provided showing the adaptable hunting blind assembly 10 attached to the ground 60. In this embodiment a solid substantially cylindrical section 70 has a proximal end 78 and a distal end 79. The proximal end 78 is configured to fixedly attach to the interior of the pole assembly 30. In one embodiment, the solid cylindrical section 70 is fixed within the at least one distal pole section 33. The distal end 79 of the solid substantially cylindrical section 70 is pointed to form a taper or spike. In the deployed configuration, the distal end 79 of the solid substantially cylindrical section 70, e.g. a spike projects from the base 72 of pole assembly 30. In the deployed configuration, the distal end 79 of the solid substantially cylindrical section 70, is configured to penetrate into the ground 60. If the pole assembly 30 is telescoped together, then the distal portion 79 of the solid substantially cylindrical section 70, in the form of a spike, projects from the base 72 of pole assembly 30 and is locked in place. In this configuration, the first securing device 36, such as a "C" clamp connects to the annular ring 15. A plurality of pole assemblies 30 are used to assemble the adaptable hunting blind assembly 10 on the ground 60. In an alternative embodiment, a separate spike element can be connected to the base 72 of the pole assembly 30 by a conventional connector such as a grommet.

In the field, the adaptable hunting blind assembly 10 is assembled as follows: The camouflage portion 23 is threaded on to the plurality of segments 16 joined by a connector 17 to form the annular ring 15. A rope is connected to the annular ring 15. A plurality of pole assemblies 30 are contained in a bag or tote (not shown) and the user climbs in to the tree stand 45 with the bag containing the plurality of pole assemblies 30 and with the rope attached to the annular ring 15. The strap 20 is attached to the tree 22. A connector 17 of the annular ring 15 is disconnected to thread the annular ring 15 through the tubular opening or sleeve 18 configured to receive the annular ring 15 and the annular ring 15 is reconnected to form a complete circle and the tree stand 45 is completely surrounded by the camouflage portion 23. The next step to assemble the adaptable hunting blind assembly 10 is to connect plurality of second securing devices 40 of the pole assembly 30 to connect to the annular ring 15. The position of the annular ring 15 is maintained by connecting a plurality of the first securing devices 36 to the tree stand 45.

Figure 6:
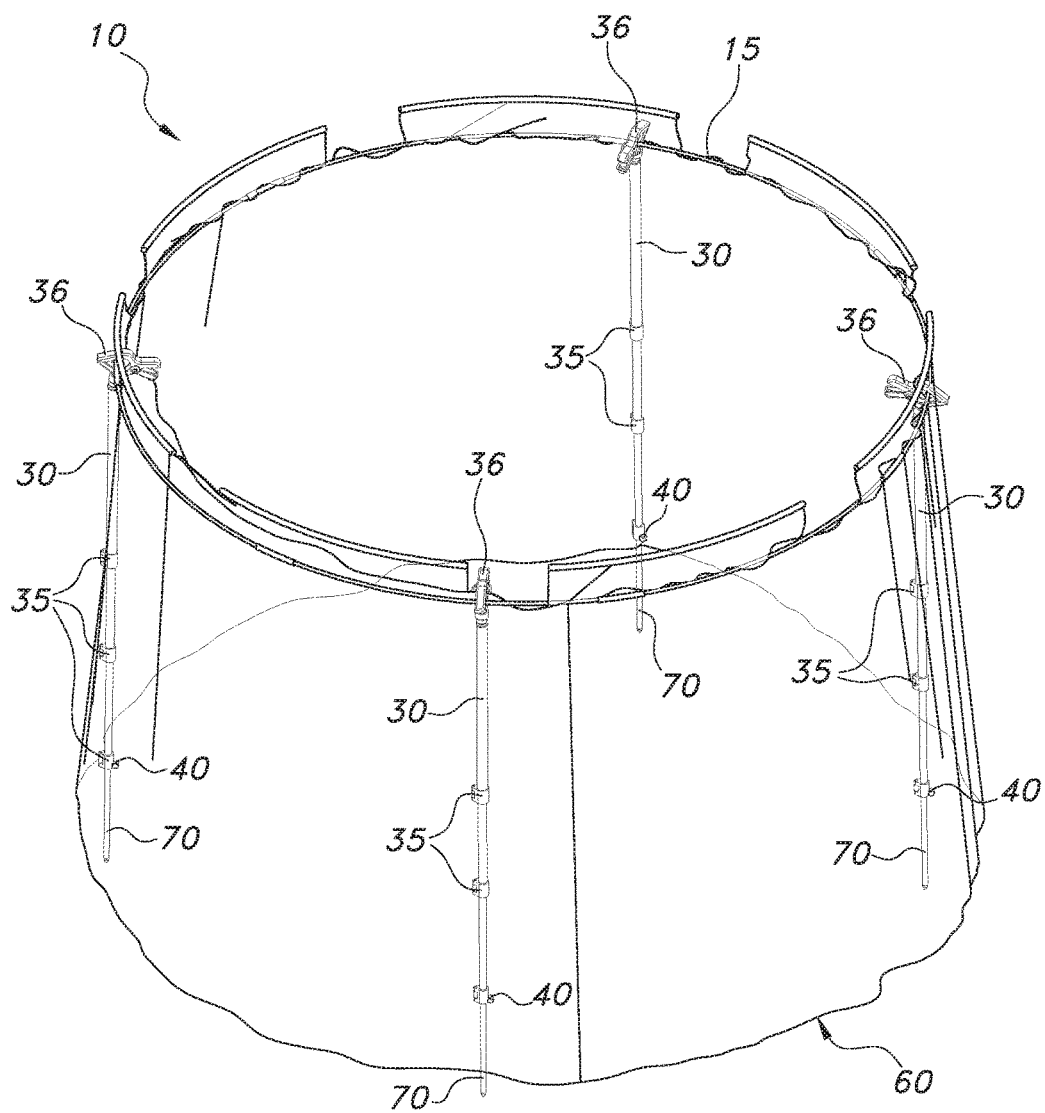
FIG. 6 illustrates an embodiment of the adaptable hunting blind assembly as configured to attach to the ground.
Figure 7:
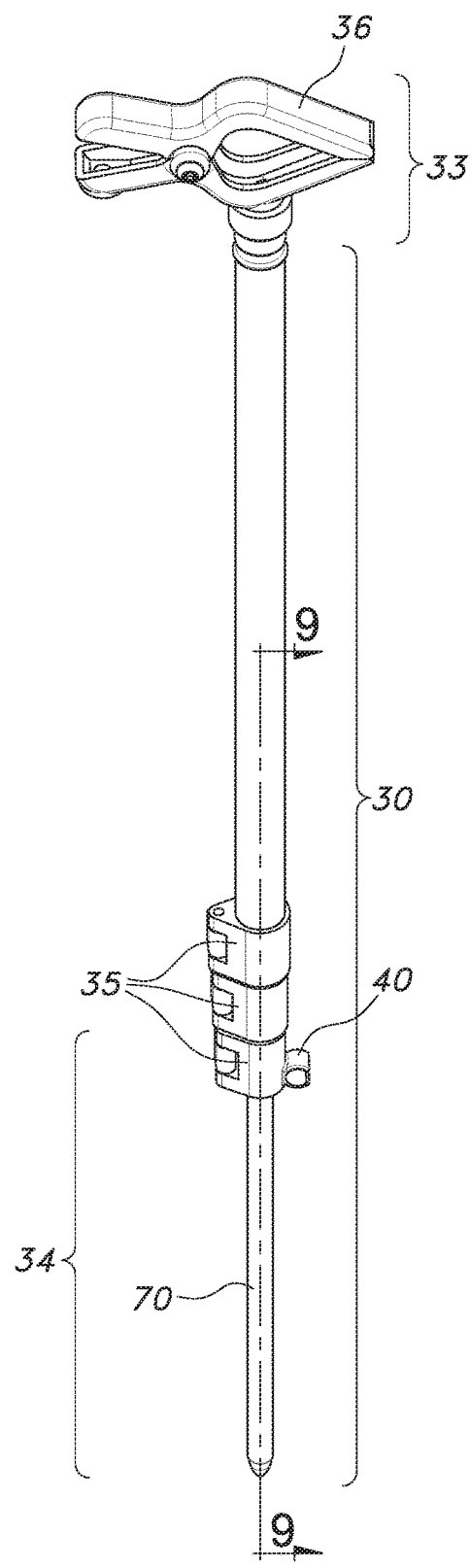
FIG. 7 illustrates an embodiment of a securing device configured to attach to the adaptable hunting blind assembly to a ground.
Figure 8A:
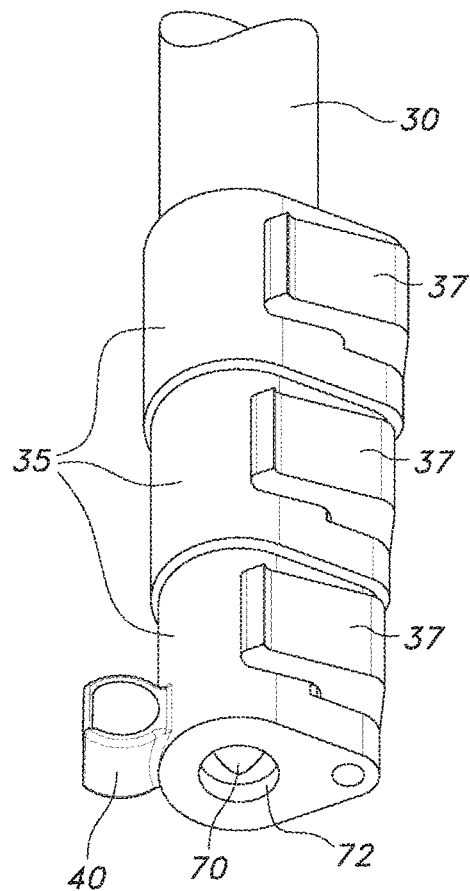
FIG. 8A illustrates an embodiment of the securing device.
Figure 8B:
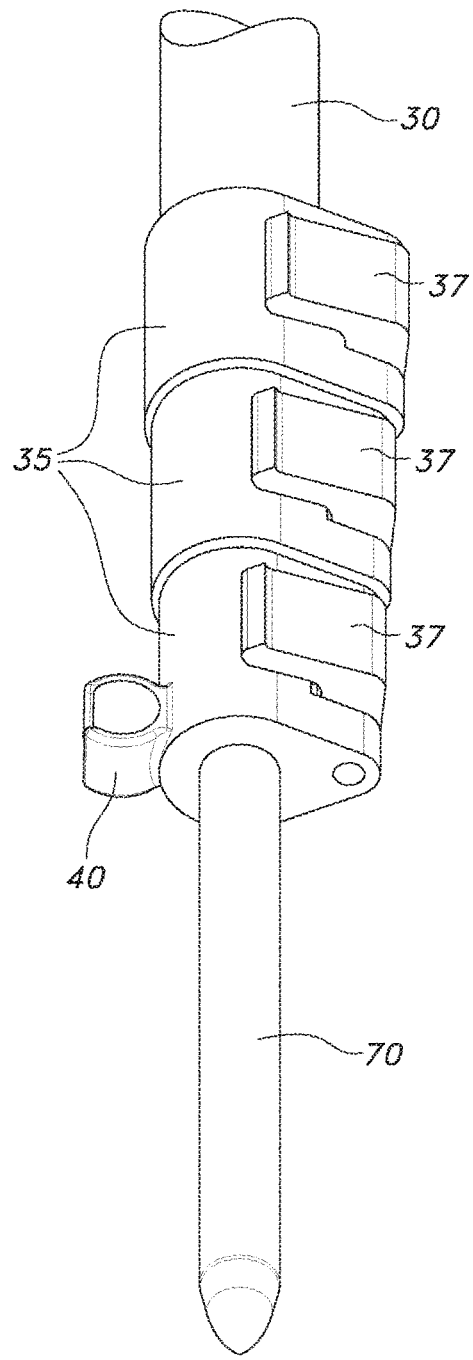
FIG. 8B illustrates an embodiment of the adaptable hunting blind apparatus with the spike deployed from the pole assembly.
Figure 9:
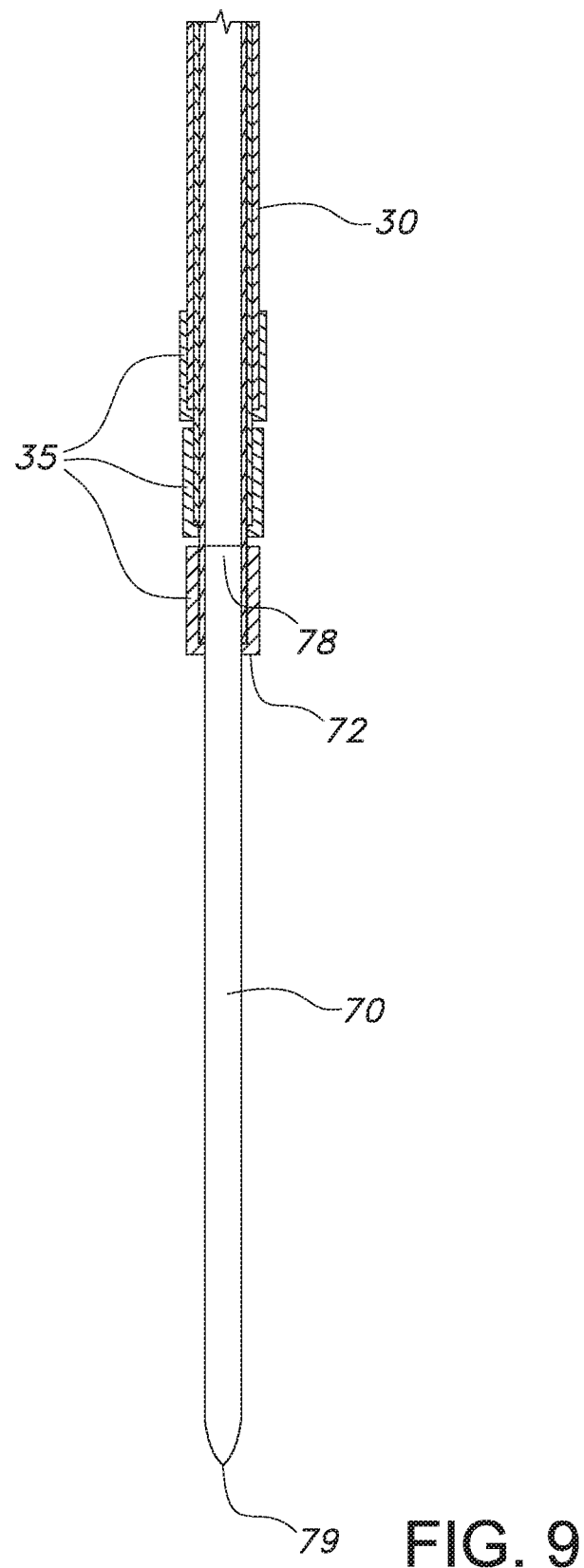
FIG. 9 illustrates an embodiment showing a telescoping tube in the collapsed configuration.

With respect to the embodiment of the ground configuration of the adaptable hunting blind assembly 10 as shown in FIG. 6, the camouflage portion 23 is threaded on to the plurality of segments 16 joined by a connector 17 to form the annular ring 15. A plurality of first securing devices 36 are connected to the annular ring 15. In the deployed configuration, the distal end 79 of the solid substantially cylindrical section 70 projects from the base 72 of pole of assembly 30 and is configured to connect the hunting blind assembly 10 to the ground 60 by forming a spike. The step of projecting a solid substantially cylindrical section 70 from an at least one distal section 33 of the pole assembly 30 by telescoping a smaller section of a pole section 33 of the pole assembly within the large section of the pole section 32, to expose a tapered distal end of solid substantially cylindrical section 70 and securing an exposed tapered distal end of solid substantially cylindrical section by fastening a telescoping tube clamp 35 to the pole section of the pole assembly 30. In this configuration generally at least four pole assemblies 30 adjusted to the same height are required to provide the adaptable hunting blind assembly 10 attached to the ground 60. In an alternative configuration, only a set of two pole assemblies 30 are required if the ground configuration is located near a tree. In this combined configuration, the strap 20 is attached to the tree 22. A connector 17 of the annular ring 15 is disconnected to thread the annular ring 15 through the tubular opening or sleeve 18 configured to receive the annular ring 15 and the annular ring 15 is reconnected to form a complete circle and the tree truck 22 is completely surrounded by the camouflage portion 23.

Equivalent elements can be substituted for the ones set forth above such that they perform in substantially the same manner in substantially the same way for achieving substantially the same result. It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. An adaptable hunting blind assembly comprising:
   an annular ring formed from a plurality of connected segments;
   a camouflage portion extending downwardly from the annular ring;
   a strap of sufficient length to wrap around a tree trunk, wherein the strap is configured to connect to the annular ring;
   a plurality of connected hollow pole sections, comprised of a proximal pole section and at least one distal pole section, wherein the proximal pole section has a diameter greater than a diameter of the at least one distal pole section, wherein the plurality of connected hollow pole sections are adjustably connected to form a pole assembly;
   a first securing device and a second securing device, said first securing device positioned substantially perpendicular to a vertical axis of the pole assembly and rotatably connected to the proximal pole section; and the second securing device connected to the at least one distal pole section of the pole assembly, wherein the first securing device connects to a tree-stand and the second securing device connects to the annular ring.

2. The adaptable hunting blind assembly of claim 1 further comprising a substantially cylindrical solid section having a proximal end and a distal end, the proximal end of the substantially cylindrical solid section fixedly positioned within the pole assembly and the distal end of the substantially cylindrical solid section having a tapered end.

3. The adaptable hunting blind assembly of claim 2, wherein the distal end of the substantially cylindrical solid section is configured to project away from the least one distal section of the pole assembly.

4. The adaptable hunting blind assembly of claim 1 wherein the first securing device is a "C" clamp having a rotating socket positioned on the top surface of the clamp.

5. The adaptable hunting blind assembly of claim 4 further comprising a ball in line with the vertical axis of the pole assembly connected to the proximal pole section, wherein the ball is configured to rotate in the rotating socket.

6. The adaptable hunting blind assembly of claim 1, wherein the second securing device is a ring in the shape of a "C".

7. The adaptable hunting blind assembly of claim 1 further comprising an attachment member attached to said first securing device, wherein said attachment member comprises a socket to rotatably connect the proximal pole section of the pole assembly and the first securing device.

8. A method to provide camouflage to a user in an outdoor setting comprising:
   providing an adaptable hunting blind comprised of:
   an annular ring formed from a plurality of connected segments;
   a camouflage portion extending downwardly from the annular ring;
   a strap of sufficient length to wrap around a tree trunk, wherein the strap is configured to connect to the annular ring;
   a plurality of connected hollow pole sections, comprised of a proximal pole section and at least one distal pole section, wherein the proximal pole section has a diameter greater than a diameter of the at least one distal pole section, wherein the plurality of connected hollow pole sections are adjustably connected to form a pole assembly;
   a first securing device and a second securing device, said first securing device is positioned substantially perpendicular to a vertical axis of the pole assembly and rotatably connected to the proximal pole section; and the second securing device is connected to the at least one distal pole section of the pole assembly, wherein the first securing device connects to a tree-stand and the second securing device connects to the annular ring; and assembling the adaptable hunting blind in the outdoor setting, wherein the first securing device connects to a tree-stand and the second securing device connects to the annular ring.

9. The method of claim 8 comprising the step connecting the first securing device to a tree-stand and connecting the second securing device to the annular ring.

10. The method of claim 9 further comprising the step of assembling the adaptable hunting blind to attach to the ground; wherein the adaptable hunting blind further includes a substantially cylindrical solid section having a proximal end and a distal end, the proximal end of the substantially cylindrical solid section fixedly positioned within the pole assembly and the distal end of the substantially cylindrical solid section having a tapered end, wherein the distal end of the substantially cylindrical solid section is configured to project away from the least one distal section of the pole assembly;

projecting the solid substantially cylindrical section from the at least one distal section of the pole assembly to expose the tapered end of solid substantially cylindrical section;

securing an exposed tapered end of solid substantially cylindrical into a locked position and setting the exposed tapered end of solid substantially cylindrical section into a ground location to secure the adaptable hunting blind to the ground location.

* * * * *